March 8, 1966  F. J. WALLACE  3,238,713
COMPOUND ENGINES FOR MOTIVE POWER
Filed Oct. 16, 1963  8 Sheets-Sheet 1

Inventor
FRANK JULIUS WALLACE

By
Wolfe, Hubbard, Voit & Osann
Attorneys

March 8, 1966  F. J. WALLACE  3,238,713
COMPOUND ENGINES FOR MOTIVE POWER
Filed Oct. 16, 1963  8 Sheets-Sheet 3
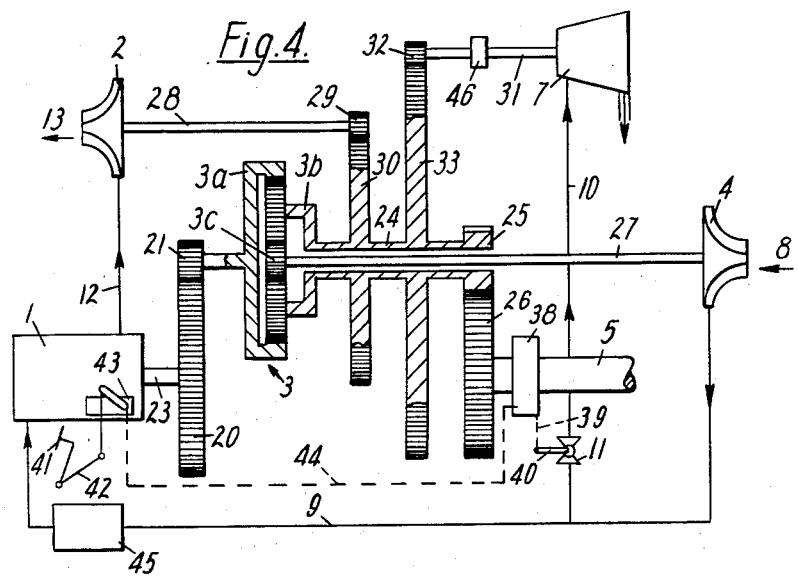
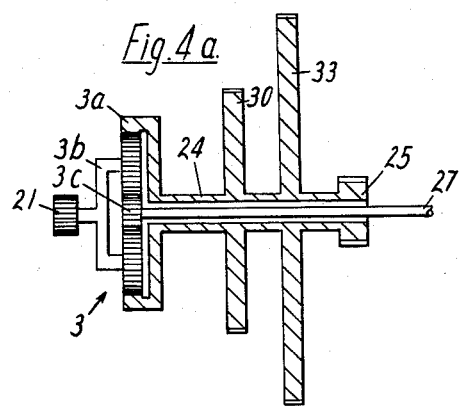
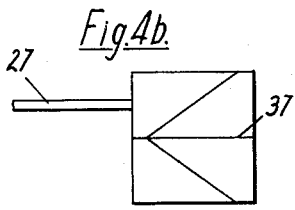
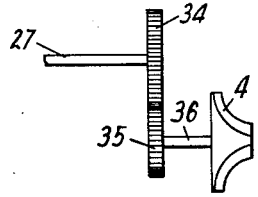
Inventor
FRANK JULIUS WALLACE
Wolfe, Hubbard, Voit & Osann
Attorneys March 8, 1966 F. J. WALLACE 3,238,713
COMPOUND ENGINES FOR MOTIVE POWER
Filed Oct. 16, 1963 8 Sheets-Sheet 4
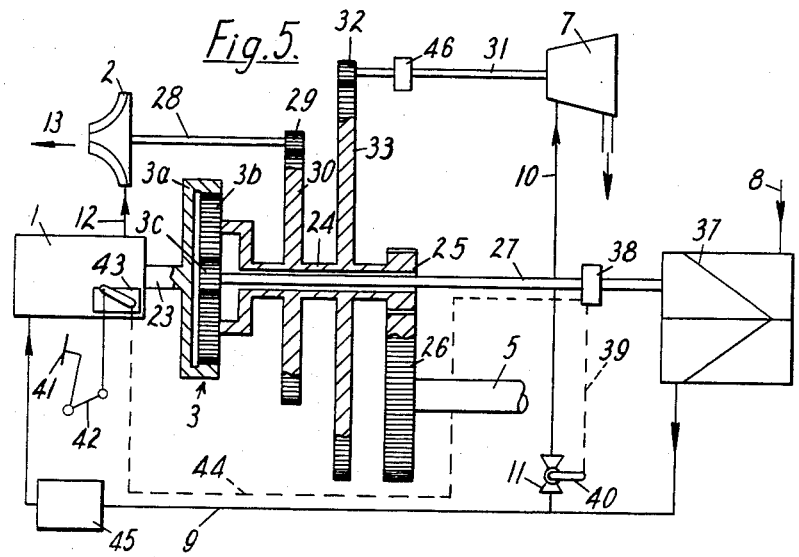
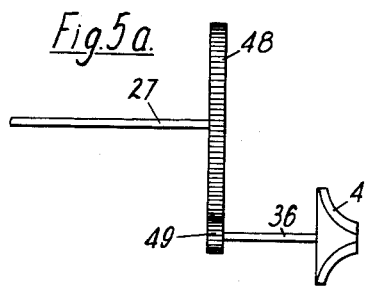
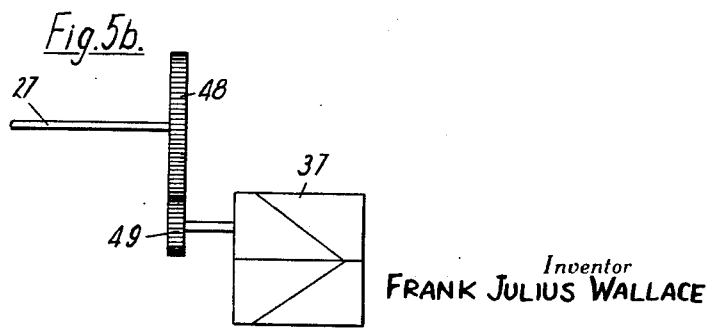
Inventor
FRANK JULIUS WALLACE
By
Wolfe, Hubbard, Voit & Osann
Attorneys

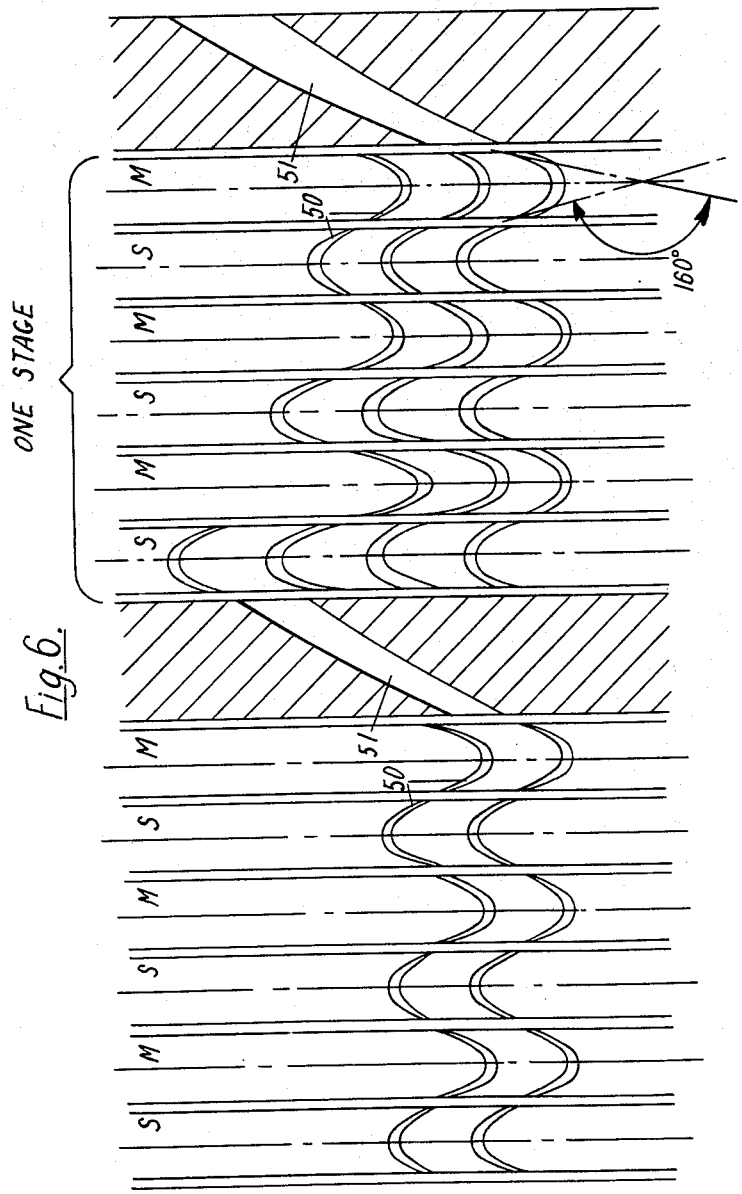

March 8, 1966   F. J. WALLACE   3,238,713
COMPOUND ENGINES FOR MOTIVE POWER
Filed Oct. 16, 1963   8 Sheets-Sheet 6

Inventor
FRANK JULIUS WALLACE

By Wolfe, Hubbard, Voit & Osann
Attorneys

March 8, 1966  F. J. WALLACE  3,238,713
COMPOUND ENGINES FOR MOTIVE POWER
Filed Oct. 16, 1963  8 Sheets-Sheet 7
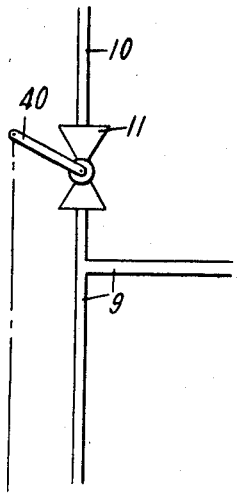
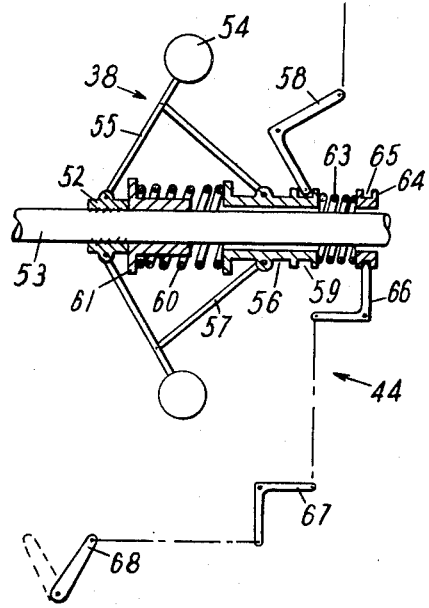
Fig.8.
Inventor
FRANK JULIUS WALLACE
By Wolfe, Hubbard, Voit & Osann
Attorneys United States Patent Office
3,238,713
Patented Mar. 8, 1966

3,238,713
COMPOUND ENGINES FOR MOTIVE POWER
Frank Julius Wallace, 3 Harberton Drive,
Belfast 9, Northern Ireland
Filed Oct. 16, 1963, Ser. No. 316,761
Claims priority, application Great Britain, Oct. 18, 1962,
15,154/62
6 Claims. (Cl. 60—13)

This invention relates to compound engines for motive power, and more specifically to propulsion units of the kind comprising a piston engine, a fluid turbine and at least one compressor, all of which are mechanically connected together and to an output member through means at least including differential gearing.

In units of this kind, the compressor is driven by the piston engine, which it serves to charge, and the exhaust gases from the engine are led through the turbine, from which useful work is derived as a contribution to the output which is usually applied as motive effort in a vehicular propulsion system.

The characteristics of a turbine are such that at constant inlet pressure, an increase of torque is obtained with decreasing rotational speed. In conventional compound engine schemes with fixed ratio gear connection between engine, compressor, turbine and output shaft, it is not possible to obtain a beneficial increase in torque at lower speeds since reduction of output shaft speed leads to reduction of the speeds of all other components, resulting in loss of compressor mass flow, boost pressure and engine power. Such simple compound engine schemes, in common with turbocharged engines, cannot in fact deliver power to a stalled output shaft, unless combined with conventional transmission aids of the electric, mechanical, hydraulic-mechanical type. Such transmission gearing adds considerably to the basic cost of the installation and can also add to maintenance problems.

The principal object of the present invention is to provide a propulsion unit which may be used, from the moment of start up, for stepless transmission of power to the driving wheels of a land vehicle of which it forms the prime mover.

According to the invention a propulsion unit comprises a piston engine, a main turbine to receive gas discharged from said engine, at least one compressor for supplying air to the engine, and an output member, all being drivingly connected together through means at least including differential gearing and at least one auxiliary turbine drivingly connected with said output member and so associated with the compressor as to receive part of the air delivered thereby at least at stall conditions of the output member.

The auxiliary turbine may be incorporated in the main turbine housing as an additional stage or stages, but preferably the auxiliary turbine is a separate unit directly coupled to the output member of the unit, and specifically designed to give at the output member when the latter is stalled four or more times the output torque derived from the remainder of the propulsion unit at the design point condition of the engine. Preferably the output torque should be ten times the design point torque and should be delivered from an output shaft which constitutes the output member. Preferably also the propulsion unit includes a first or supply passage connecting the compressor to the engine, a second or exhaust passage for conveying the gas discharge from the engine to the main turbine, a third passage for conveying air in excess of that demanded by the engine to the auxiliary turbine, said first and third passages meeting at a junction, a valve placed in said third passage to restrict or prevent the flow of excess air to the auxiliary turbine, and an air cooler placed in said first passage between said junction and said engine.

In the invention according to the preceding two paragraphs it is preferred that the auxiliary turbine is of the axial flow impulse type, that is of the type where a high momentum transfer takes place from the gases flowing through the turbine to the turbine rotor. It can have a single stage or multiple stages. Preferably the impulse turbine is bladed so that gas impinging on the rotor and stator blades thereof is turned through an angle of about 160°. Also it is preferred that two centrifugal compressors are used, though any other suitable types may be used.

The invention will now be described by way of example with reference to the accompanying drawings in which:

FIG. 4 illustrates diagrammatically some of the basic elements of FIGS. 2 and 3 in a first preferred embodiment.

FIGS. 4a, 4b, 4c illustrate alternative details.

FIG. 5 illustrates diagrammatically some of the basic elements of FIGS. 2 and 3 in a second preferred embodiment. FIGS. 5a and 5b illustrate alternative details.

FIG. 6 illustrates the type of blading present in an auxiliary turbine to be used in the present invention.

FIG. 8 shows a speed sensitive device responsive also to the position of the fuel control.

Figure 1:
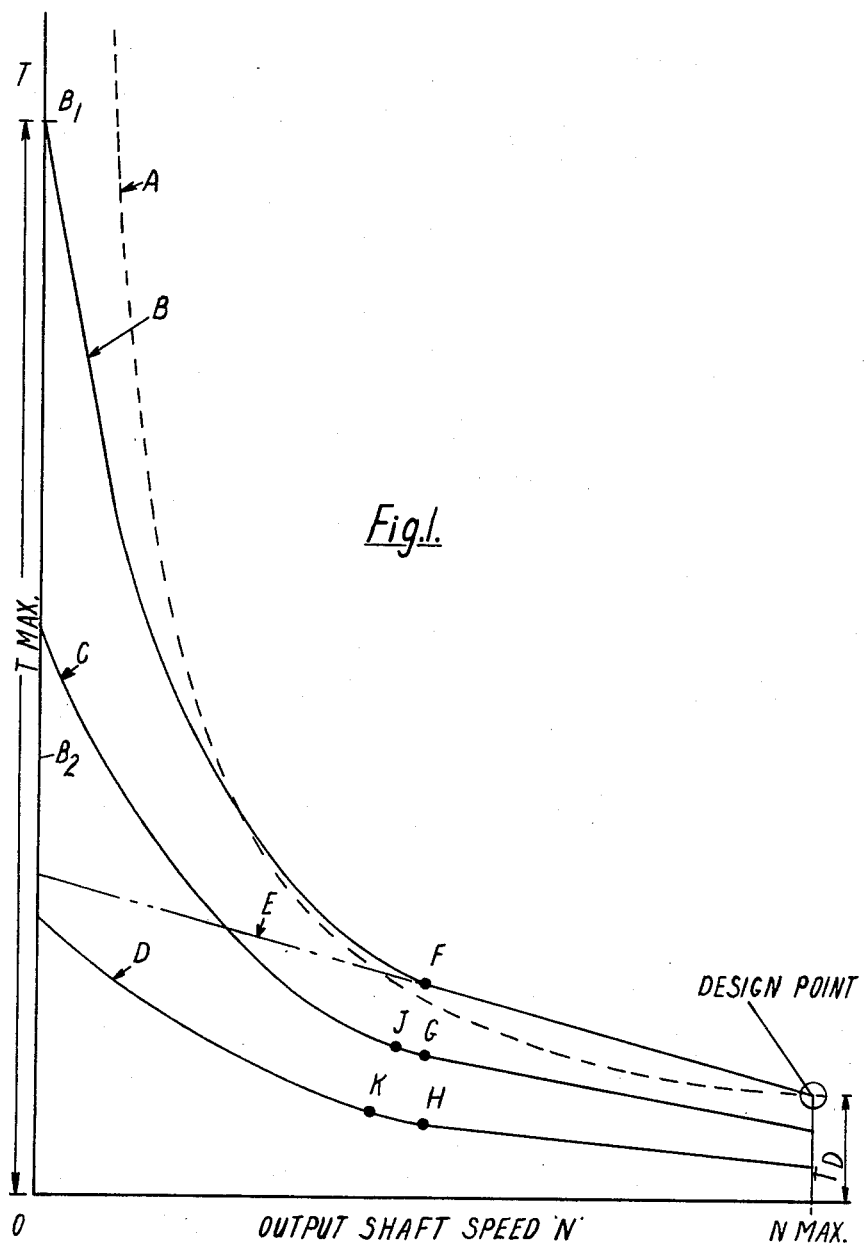
FIG. 1 is a torque against speed graph for the primary purpose of aiding in the definition of certain terms in the specification.

FIG. 1 of the drawings shows a graph of the torque T on a shaft against the speed of rotation N of that shaft. If the shaft is connected to a prime mover so that it constitutes the sole output shaft, then for the prime mover to be working at constant horsepower the torque-speed curve must take the form of a curve like curve A, that is a hyperbola. The product of torque and speed at any point on this curve is a constant i.e. $TN=K$ and since the horsepower is a function of the product of torque and speed it must necessarily follow that the prime mover is working at constant horsepower. An example of a prime mover of this kind is the steam engine, the torque-speed curve of which is very similar to curve A.

It has been the objective of engineers working in the field of internal combustion engines to make a propulsion unit having a torque-speed characteristic similar to curve A and incorporating a reciprocating internal combustion piston engine.

Curve B is representative of the torque speed characteristic of a propulsion unit according to the present invention when the engine is maintained at its maximum allowable speed, while the output shaft speed varies from zero to its maximum. Curves C and D are illustrative of the torque curves obtainable at the output shaft when the engine is run at speeds lower than its maximum allowable or rated speed.

The term "design point condition" has been mentioned above; it refers to the conditions exisiting throughout the propulsion unit when the speed of the shaft is N(Max) (see FIG. 1) and the maximum torque obtainable from the unit at that speed $T_D$ is being transmitted through the output shaft. This is the condition around which the whole of the propulsion unit is designed. It will be seen by reference to FIG. 1 that T(Max) will be about ten times the torque at speed N(Max), i.e. the design point torque according to curve B. It should be noted particularly that curve B is only representative and that by suitable design of the propulsion unit it can be arranged that the point B1 at which the curve B intercepts the torque ordinate can be as low as B2 where the torque will be about four times $T_D$ or it can be higher than B1 where the torque can be as high as twenty times $T_D$ or more. Clearly for different installations of the propulsion unit different torque requirements will be necessary e.g. for a railway locomotive application the torque spread i.e. the ratio between T(Max) and $T_D$ need only be say 5:1 while for road-using trucks a torque spread of 10:1 would be acceptable. In the case of earth-moving vehicles the torque spread might need to be as high as 20 or more to 1.

On FIG. 1 there will be seen a line E which represents the limit of the maximum torque available from the propulsion unit without the aid of the auxiliary turbine. The vertical distance between line E and curve B at any particular speed represents the contribution of the auxiliary turbine and will clearly be seen to be the major factor in achieving a high torque when the output shaft is stalled. Thus the auxiliary turbine governs to a very great extent the torque available from the output shaft at its lower speeds.

Figure 2:
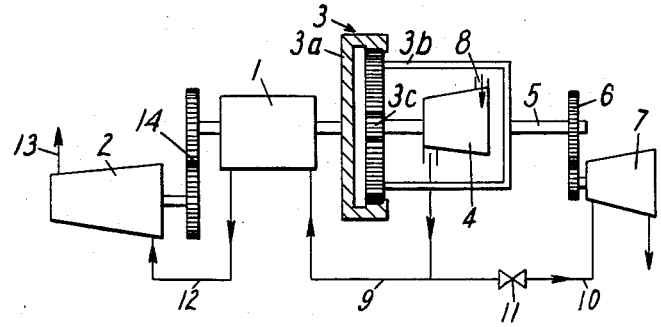
FIG. 2 is a diagrammatic drawing showing one basic form of the invention.
Figure 3:
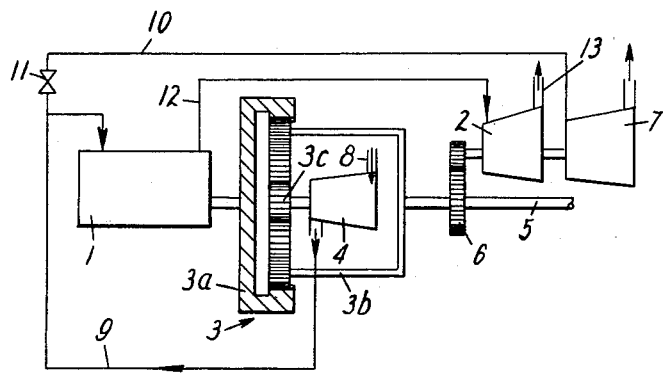
FIG. 3 is a diagrammatic drawing of a second basic form of the invention.

FIGS. 2 and 3 of the present drawings represent the basic concepts of the invention and should not be regarded as being illustrative of actual embodiments.

In FIG. 2 of the drawings a reciprocating, compression ignition piston engine, represented by a box 1, is shown to be connected through gearing 14, to a main turbine 2, the engine driving the annulus 3a of a sun and planet gear 3 which constitutes the differential gearing and sun wheel 3c of the gear 3 being arranged to drive a compressor 4. The planet carrier 3b of the gear 3 is coupled to the output shaft 5 of the unit and a gear 6 connects an auxiliary turbine 7 also to the output shaft 5.

The compressor 4 takes in air at the compressor inlet 8 and delivers it, boosted to a pressure of, say, four atmospheres through a pipe 9 to the engine, and on occasion through a branch pipe 10 to the auxiliary turbine 7. A valve 11 is provided in the pipe 10 to control the delivery of air to this turbine. Exhaust gases from the engine 1 are discharged through a pipe 12 to the main turbine 2, whence they are discharged to atmosphere at 13.

When the output shaft 5 is driving under design conditions, i.e. full torque $T_D$ at maximum speed N(Max) say, it is arranged that the by-pass valve 11 is closed, or substantially so, and the output from the compressor, having passed through the engine 1 serves to drive the turbine 2.

In FIG. 3 the same reference numerals are used as in FIG. 2 but it is to be observed that the main turbine 2 is now directly geared to the output shaft by a simple reduction gear the auxiliary turbine 7 being now drivingly connected to the main turbine. Also the engine 1 is drivingly connected to the annulus of the differential gear 3.

In order to obtain the benefit of the additional torque from the auxiliary turbine it is necessary that it becomes operative between zero speed and a predetermined speed of the output shaft. Accordingly it is necessary for the auxiliary turbine to give maximum assistance at a stall condition of the output shaft such assistance to be reduced gradually until the propulsion unit is capable of meeting the demands imposed on it at normal cruising speeds of the vehicle in which the propulsion unit is fitted. The valve 11 which controls the amount of air delivered to the auxiliary turbine must therefore begin to open at a predetermined speed of the output shaft as the speed of the output shaft falls and must be fully open when the output shaft is stalled.

The predetermined speed at which the valve 11 begins to open as the output shaft speed falls, can be arranged to be the same speed for all speeds of the engine, or it can be arranged to be at different speeds of the output shaft for different engine speeds. The valve can be made to open according to a chosen law as will be described later. The valve will begin to close progressively as the output shaft speed is increased from zero and will be fully closed or substantially so when the predetermined speed of the output shaft is reached, the auxiliary turbine making no contribution to output torque at this point. The references used in respect of FIGS. 2 and 3 to denote the main parts of the propulsion unit will be used throughout the following descriptions.

In FIG. 4 there is illustrated a more practical arrangement of parts of the propulsion unit according to the invention. The reference 1 designates a horizontally opposed, two-stroke compression ignition engine and will be referred to as the engine. The engine can be designed to use the uniflow scavange system. A speed step-up gear pair 20 and 21 is used to connect the engine shaft 23 with a sun and planet differential gear 3. The gear wheel 21 is fixedly joined to the annulus 3a of the differential gear and the planet carrier 3b is drivingly connected to the output 5 through a sleeve 24 and a speed step down gear pair 25 and 26. Sun-wheel 3c is arranged to drive a centrifugal compressor through a shaft 27. A shaft 28 and a gear wheel 29 connect the main turbine 2 with a gear wheel 30 secured to the sleeve 24 and a shaft 31 and speed step down gear pair 32 and 33 connect the auxiliary turbine 7 with the sleeve 24. By increasing the speeds of all members of the differential gear through gear pair 20 and 21 the level of torque for the same throughput of horsepower is correspondingly reduced, as compared with a direct drive to the differential, and hence the differential gear elements may be made smaller leading to a smaller and cheaper differential gear. It will be appreciated that centrifugal compressors in general have to be driven at high speeds, consequently the increase in speed of all elements of the differential gear means that it is possible with suitable design to drive the centrifugal compressor without resort to any further gear train between the sun wheel 3c and the compressor. The speed of the sun wheel 3c even so may not be sufficiently high in certain circumstances to meet the speed requirements of the centrifugal compressor and it may then be necessary to resort to a further speed step up gear train 34 and 35 between the sun wheel 3c and the compressor 4 as seen in FIG 4c. The compressor shaft in this case is represented as 36.

FIG. 4a shows how the gear wheel 21 is connected to the differential gear 3 through the planet carrier 3b and the sleeve 24 is fixed to the annulus 3a. This arrangement of gears forms an alternative to that shown in FIG. 4 and can have its advantages in certain practical forms of the propulsoin unit. In FIG. 4b a positive displacement compressor 37 such as a lobed compressor is shown connected to the compressor shaft 27. Such compressors are not usually driven at such high speeds as similar sized centrifugal compressors and the speed requirements of such compressors could easily be met by driving directly from the sun-wheel 3c through shaft 27.

The need for a speed step-up drive for the compressor is to ensure that the compressor 4 is driven at a speed compatible with its size and characteristics having regard to the fact that it is required to deliver a varying amount of air, at times at high output pressures and to provide a torque reaction for the differential gear in order that the latter be capable of transmitting torque to the output shaft 5.

A speed sensitive device 38 is associated with the output shaft 5 and the dotted line 39 represents a signal operative to condition the lever 40 of the valve 11 in accordance with such speed.

A foot pedal 41 or like engine control operating a linkage 42 to condition the engine speed governor 43 of the engine 1 and is operative with the governor to move a control member so as to regulate the amount of fuel being injected into the engine. Reference numeral 44 indicates a signal path extending from the fuel control member to the speed sensitive device 38 to affect the latter in a manner subsequently to be described. The signal path 39 and 44 may consist of any known control means such as cables, bell cranks, fluid pressure lines, valves, etc.

An air cooler 45 is placed in the pipe 9 between the branch pipe 10 and the engine. The air entering the engine must be at a reasonable temperature for the combustion process to take place satisfactorily but on the other hand it is not desirable to abstract heat energy from the air which is used to drive the auxiliary turbine. For this reason the air cooler 45 is placed between the pipe 10 and the engine 1. Reference numeral 46 denotes a one-way clutch on the auxiliary turbine shaft 31 which prevents the auxiliary turbine from being overspeeded when the latter is not positively driving the output shaft.

In an alternative embodiment shown in FIG. 5 the engine shaft 23 is directly coupled to the annulus 3a of the differential gear, the planet gear carrier 3a being drivingly connected to the output shaft through sleeve 24 and gears 25 and 26 and the sun wheel 3c being drivingly connected to a positive displacement compressor 37. The main turbine 2 and the auxiliary turbine 7 are connected to the output shaft as set out in respect of FIG. 4. The further gear train 48 and 49 is arranged to be such that the centrifugal compressor 4 (FIG. 5a) or a positive displacement one 37 (FIG. 5b) is driven at a speed compatible with the air requirements of the rest of the propulsion unit and with the requirement that it provides torque reaction to enable the engine to drive the output shaft. The speed sensitive device 38 in this embodiment is driven by the shaft 27. The remainder of the elements having reference numerals are similar as those described with reference to FIG. 4.

FIG. 6 illustrates in diagrammatic form the type of blading present in the auxiliary turbine 7 which is a two-stage axial-flow type. It will be seen that the air impinging on a blade 50 whether stationary or rotating is turned through 160° and consequently a high momentum change takes place. A rapid momentum change being known as an impulse, this type of turbine is sometimes known as an impulse turbine. The blades of rows M are carried on a rotor while the stationary blades of rows S project radially inwardly from a housing between the rows M in known manner. Nozzles 51 are placed to direct air discharged therefrom on the moving blades of the adjacent first row.

Figure 7:
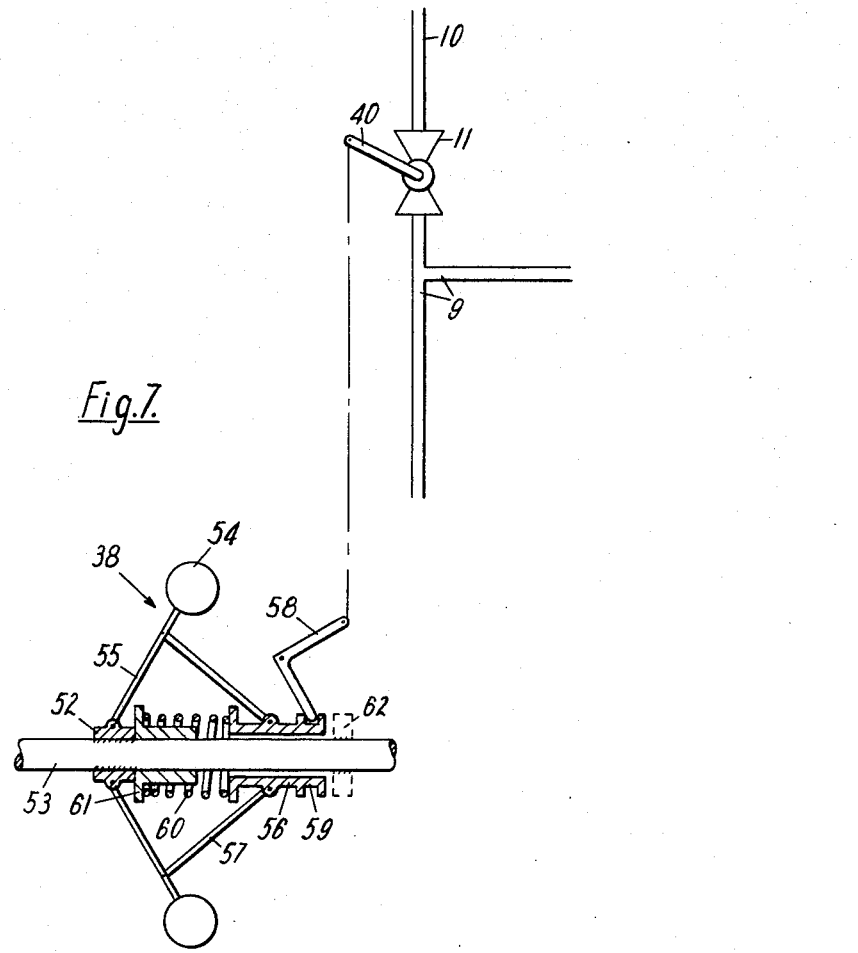
FIG. 7 shows one form of speed sensitive device.

FIG. 7 shows a type of speed sensitive device 38 referred to previously.

The device 38 comprises a fly-weight governor having one collar 52 fixed to and rotatable with shaft 53, two or more fly-weights 54 carried on the ends of arms 55 pivotable on the collar 52, a sleeve 56 slidable on the shaft 53 and further arms 57 each pivotably connected at one end to arms 55 and at the other to sleeve 56. A bell crank 58 has one end slidably located in an annular groove 59 in the sleeve 58, and the other end operatively connected to lever 40 of the valve 11. A spring 60 biases the sleeve in one direction. As the speed of the shaft increases the sleeve will move towards the left and this displacement when transmitted to the valve will move lever 40 of the valve 11.

The shaft 53 could be constituted by the output shaft 5 or of any shaft or member such 24 or 3b driven at a speed proportional to it. Alternatively it could be constituted by the compressor shaft, or any shaft or member such as shafts 27 (FIGS. 4 and 5) which rotate at a speed proportional to the compressor speed.

Considering first the case when the fly-weight governor is driven by the output shaft 5 the movement of the lever 40 of the valve 11 referred to, would be arranged to progressively close the valve 11 so that when the output shaft is stalled the sleeve 56 would be at the limit of its rightward travel. A limit stop 61 would prevent further operation of the valve 11 after it had reached a predetermined speed when it closed. The predetermined speed in this case would give rise for example to the points F, G, and H on curves B, C and D respectively (see FIG. 1).

Figure 9:
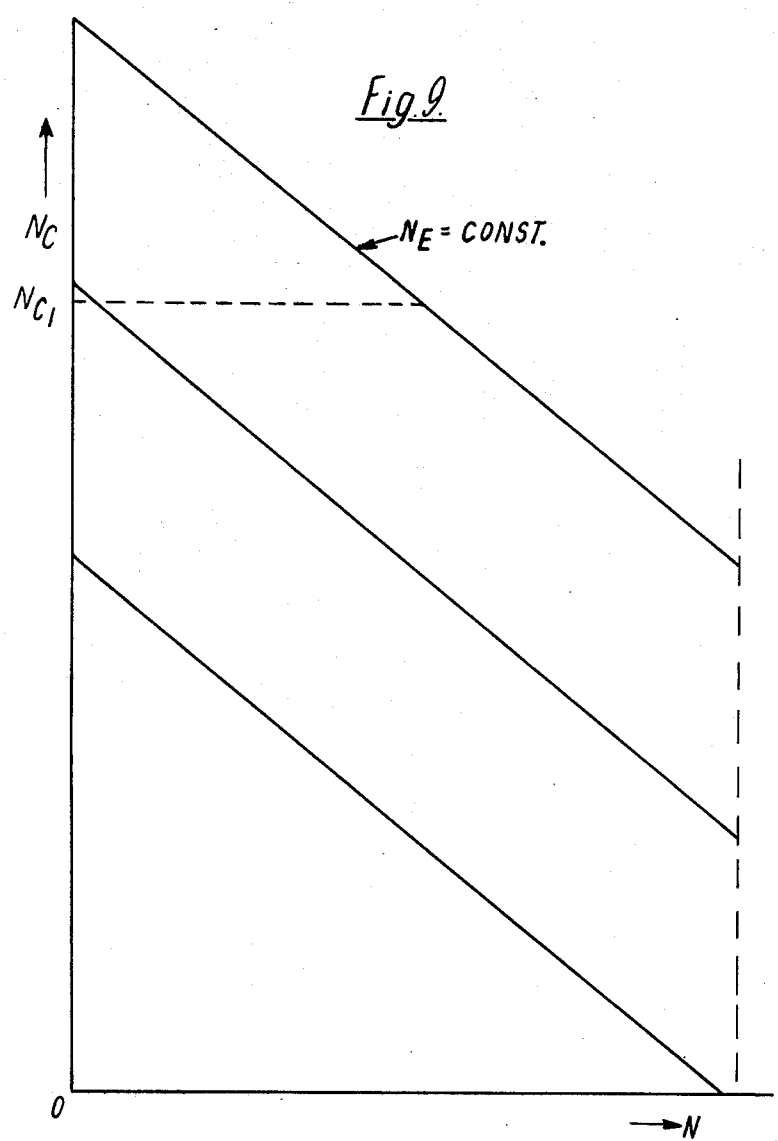
FIG. 9 is a graph showing the relationship between the speeds of the elements of the differential gear.

In the case where the flyweight governor is driven from the compressor shaft 27 or 36 or a shaft moving at a speed proportional thereto, the movement of the lever 40 of the valve 11 referred to would be arranged to progressively open the valve 11. If the engine speed were held constant the differential gearing 3 is such that when the output shaft speed decreases to zero the compressor speed increases to a maximum. Accordingly, to open the valve 11 progressively such opening would be responsive to an increase in the compressor shaft speed from a predetermined speed thereof to its maximum. FIGURE 9 shows the relationship of compressor speed ($N_C$) to output shaft speed N at different values of engine speed ($N_C$) corresponding to curves B, C and D in FIG. 1. If the opening of the valve 11 is set to begin at speed $N_{C1}$ the speed of the engine affects the output shaft speed at which this happens. The predetermined speed at which the auxiliary turbine begins to assist the output shaft as the speed of the latter falls is therefore conditional on the engine speed when the governor is driven from the compressor shaft alone. In this case the points on curves B, C and D at which the valve 11 begins to open would appear for example, as F, J, and K respectively. A limit stop 62 (ghost outlined in FIG. 7) would have to be incorporated in the flyweight governor to define the lower limit of operation of the governor if driven from the compressor shaft alone as described with reference to FIG. 5.

In FIG. 8 there are shown similar elements to those shown in FIG. 7. In this speed sensitive device, which is driven either by the output shaft 5 or the compressor shaft 27, the sleeve 56 additionally biased in a direction to move the lever 40 to a valve opening position by a spring 63 acted upon by a sleeve 64 having an annular groove 65 in which one end of a bell crank 66 is slidably located. The bell crank 66 together with a further bell crank 67 constitute part of the signal path 44, referred to previously with respect to FIG. 4, which originates from the fuel control member represented as a lever member 68. By suitable design of the parts of the speed sensitive device the points at which the valve 11 begins to open when the engine is at part load can be predetermined. Further the opening of the valve may be made to follow a chosen law by design of the speed sensitive unit.

If the auxiliary turbine were not present in the propulsion unit it could be arranged that the engine is uprated from its normal rating for starting the vehicle. This would mean that the engine would be conditioned to deliver a higher torque than normal at the same speed by supplying extra fuel for combustion. The setting of injectors and fuel pumps in the case of a diesel engine, would have to be suitably adjusted to accomplish this. A higher torque delivery from the engine would necessarily mean a higher torque being applied to the pump compressor resulting in an increased boost pressure in the engine manifold. An increased mass flow would result leading to an increased torque from the main turbine. Thus the engine could be required to deliver a greatly increased horsepower and torque at the same speed as the design conditions, however it has to be remembered that during starting-up of the vehicle the output shaft is stalled or is only travelling very slowly and the compressor would have to be designed to absorb the full increased torque from the uprated engine. Even with this increased power the torque at the output shaft derived from both the engine and the main turbine could not be raised to a level of much more than three times the value of the torque at the normal design conditions. In fact to obtain power from the engine by such a method would be an encroachment on the "margin of reliability" built into the engine and would thus be undesirable. In any case a threefold multiplication of the normal torque obtainable at design conditions is not sufficiently great in normal tractive systems, to provide adequate torque conversion values without the use of conventional transmission aids.

A further disadvantage of the above method of obtaining increased torque would be that the compressor being designed to cope with the transient conditions at start-up of the vehicle, would deliver a greatly increased mass flow throughout its range, part of which would have to be by-passed to atmosphere.

In order to reduce this, possibly excessive, engine rating at stall, the system, still considered without the auxiliary turbine, could be optimized, for instance, to require the engine to develop the same output at the stall point as at its design point. In that event, the compressor would not have to absorb more than the design horsepower of the engine, which, although high in comparison with the normal running horsepower of the compressor, gives a less exacting design parameter than in the previous arrangement. However, in spite of the reduction of power absorption, the same over-speeding of the compressor at stall results, with the inherent requirement for by-passing part of the increase of mass flow from the compressor; and, moreover, the total combined torque at the output shaft falls to a factor of only about twice the design torque.

Utilising by-pass arrangements in accordance with the present invention, that is by incorporating the auxiliary turbine, the augmented mass flow can readily be arranged to develop at the output shaft, through suitable step-up gearing, a starting torque which is ten times the design torque and would thus be suitable for a road truck. This latter value will of course be sufficiently high to enable the engine unit to move a vehicle from rest with a reasonable initial acceleration to highest speed without the necessity for auxiliary transmission means, i.e. a straightforward stepless transmission of power becomes possible from start-up.

One advantageous feature of the invention should be particularly noted. The large increase in torque obtainable from the propulsion unit at low output shaft speeds is due to the design of the auxiliary turbine and to the driving connection shaft, particularly to the torque ratio of the driving connection. The gears 32 and 33 (FIGS. 4 and 5) are to a very large extent, the governing factors in determining the torque applied by the auxiliary turbine to the shaft, though the size and design of the auxiliary turbine are significant factors also. It will be appreciated that while the auxiliary turbine is a very expensive component of the propulsion unit the gear wheels 32 and 33 are not, and consequently the low speed performance of a particular combination of engine, main turbine, compressor, auxiliary turbine and differential gearing can be varied considerably to suit a range of installations merely by altering the sizes of the meshing gear wheels 32 and 33. Thus flexibility of installation can be introduced at a very low cost.

The manner in which individual components of a unit in accordance with the invention may be designed, to achieve given desirable characteristics, will be clear to those skilled in the art.

No mention of apparatus required for reversing of a vehicle fitted with a propulsion unit, according to the present invention, has been made. It will be apparent that such apparatus is beyond the scope of the invention and that suitable conventional means for reversing the vehicle can be used.

The efficiency of the auxiliary turbine will be of subsidiary importance in view of its primary function as a torque intensifier.

I claim:

1. A propulsion unit comprising, in combination, an internal combustion engine, a differential gear drivingly connected to said engine and having two outputs, an output shaft coupled to one of said outputs, a compressor coupled to the other of said outputs, a turbine designed for efficient energy conversion under stall conditions drivingly connected to said output shaft, and means for directing the gas output of said compressor to both said engine and said turbine, said means being closed to the exhaust from said engine and including a valve for limiting operation of said turbine to an initial speed range of said output shaft.

2. The combination of claim 1 including a main turbine arranged to add torque to said output shaft, and means for directing exhaust gases from said engine to said main turbine.

3. The combination of claim 1 in which the driving connection between said turbine and said shaft includes a centrifugal clutch effective to break the connection at speeds above said initial speed range.

4. The combination of claim 1 including means responsive to the speed of said compressor for progressively opening said valve as compressor speed increases.

5. The combination of claim 1 including means responsive to the speed of said output shaft for progressively closing said valve as output shaft speed increases.

6. A propulsion unit comprising, in combination, an internal combustion engine, a differential gear drivingly connected to said engine and having two outputs, an output shaft coupled to one of said outputs, a compressor coupled to the other of said outputs, a turbine designed for efficient energy conversion under stall conditions drivingly connected to said output shaft, means for directing the gas output of said compressor to both said engine and said turbine, said means including a valve for limiting operation of said turbine to an initial speed range of said output shaft, and means for closing said valve when said initial speed range is exceeded.

References Cited by the Examiner
UNITED STATES PATENTS

| | | | |
|---|---|---|---|
| 2,625,006 | 1/1953 | Lundquist | 60—13 |
| 2,848,866 | 8/1958 | Geislinger | 60—13 |
| 2,880,571 | 4/1959 | Glamann | 60—13 |
| 2,929,198 | 3/1960 | Crocchi | 60—13 |
| 3,007,302 | 11/1961 | Vincent | 60—13 |

SAMUEL LEVINE, *Primary Examiner.*

KARL J. ALBRECHT, *Examiner.*